Fisk & Westerman,
Mining Coal.
Nº 45,917.      Patented Jan. 17, 1865.
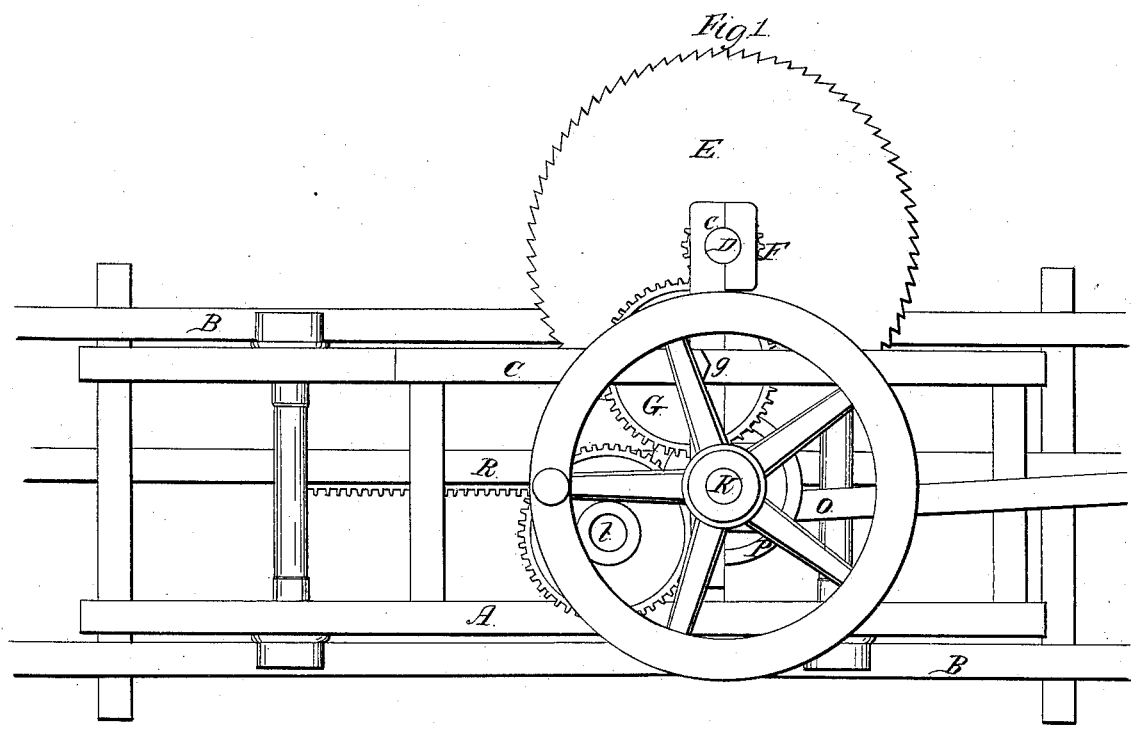
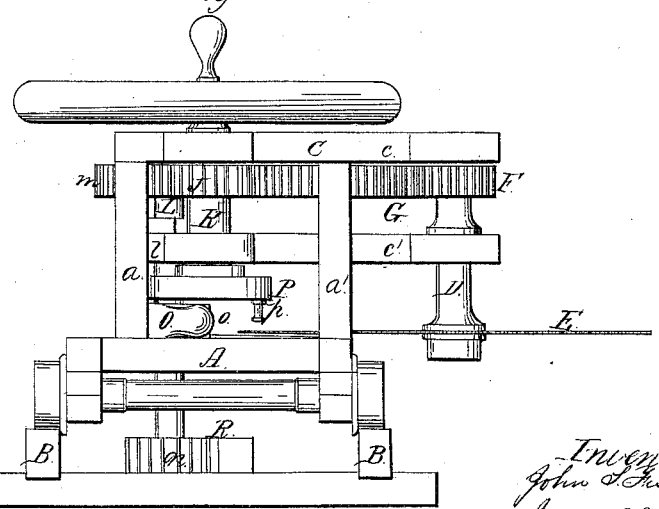
Witnesses.
Henry Baldwin
Wm. D. Baldwin
Inventors.
John S. Fisk.
James Westerman

UNITED STATES PATENT OFFICE.

JOHN S. FISK, OF MEADVILLE, AND JAMES WESTERMAN, OF SHARON, PA.

IMPROVED COAL-MINING MACHINE.

Specification forming part of Letters Patent No. 45,917, dated January 17, 1865.

*To all whom it may concern:*

Be it known that we, JOHN S. FISK, of Meadville, in the county of Crawford and State of Pennsylvania, and JAMES WESTERMAN, of Sharon, in the county of Mercer and State aforesaid, have invented a new and useful Improvement in Machines for Mining Coal; and we do hereby declare the following to be a full, clear, and exact description of the construction and operation of the same, reference being had to the annexed drawings, making part of this specification, in which—

Figure 1 represents a plan view of a machine showing our invention; Fig. 2, an end elevation of the same, and Fig. 3 a view of the arbor with several saws attached.

Like letters refer to like letters in all the figures.

Attempts have been made to use machinery in mining which should give picks a motion similar to that they receive when wielded by the miner, but the pick, however used, always reduces a large amount of coal to slack, which is of little value.

It is the object of our invention to substitute machinery for hand-labor in mining, with particular reference to the economy of the material by sinking thin single-line cuttings in lines perpendicular to the axis of the cutter-shaft; and to this end our invention consists in so mounting a circular saw or saws upon an arbor or shaft that it or they may rotate in a horizontal plane at the lower end of the arbor or on any desired part of its length, (and when more than one saw is used on the same arbor they may be placed at any desired distance apart,) and combining the arbor and its saw or saws with gearing to give it both a rotating and a feeding motion when the latter can be made constant or intermittent, at the pleasure of the operator.

In order to carry out the object of our invention, we construct (as shown in the accompanying drawings) a truck, A, of the most approved materials and of a capacity in length and width to accommodate the circular saw, the mechanism by which it is controlled and any suitable motor to propel it. We adapt the wheels of the truck to the railroad or tramway B, that leads into the mine. We prefer to have the truck move on rails; but it may be made to rest on the floor of the mine when working in advance of the tramway or on either side thereof. On the bed-frame of the truck we construct a suitable frame, C, consisting of uprights $a$ $a'$ $a^2$, which support cross-bars $b$ $b'$ $c$ $c'$, arranged parallel to each other and to the bed-frame of the truck. The bars $c$ $c'$ project to one side of the frame a sufficient distance to carry the mandrel D, which runs in suitable bearings secured to these bars, while between them a sufficient space is left to permit a free rotation to the gearing which drives the mandrel which carries the saw E. This mandrel carries a pinion, F, which gears into a spur-wheel, G, running on a stud, $g$, suspended from the cross-bar $c$, to which the stud is securely fastened. On the side opposite the pinion F the spur-wheel G couples with a driving-pinion, J, on the main driving-shaft K, which is supported in place by proper boxes attached to the cross-bars $c$ $c'$, in which it is suspended by suitable collars. To the lower end of the main shaft a pulley, P, is attached which may receive a carrying-belt from a drum on the motor or a crank-pin, $p$, to unite with a crank on the motor by a pitman connection. An arm, $l$, projecting from the back of the cross-bar $c'$, carries in suitable boxes a shaft, L, having a spur-wheel, $m$, on its top that gears with pinion J on the main shaft K. A pinion, $n$, is mounted on the lower end of the shaft L and gears with a rack, R, on the tramway, or with one fastened to the floor in a proper position when the truck is worked independently of any supporting rail or tram road. Near its lower end the shaft $n$ is embraced by a lever, O, having its fulcrum on the truck-frame, with a handle, $o$, suitably placed within reach of the operator. When power is applied to the disk P, it will, through the pinion J, spur-wheel G, and pinion F, impart rotary motion to the saw E in the direction desired. The saw can be kept all the time in regular progression in its forward movement on the tramway by the movement of the lever O in such direction as to bring the pinion $n$ into connection with the rack R on the railway, or when secured on the floor of the mine, and when it is desired to stop the forward movement of the saw the movement of the lever O in the opposite direction will separate the pinion from the rack, and thus stop the feeding of the saw, while it will still be free to rotate and continue to cut its channel in the coal; in other words, as both the saw and spur-wheel $n$ receive motion from the pinion J, the saw will continue to move while the main shaft rotates, but the detachment of the pinion $n$ from the rack by means of the lever O will leave the forward movement of the truck at the will of the operator.

In the drawings the feed motion of the saw is shown as given by a rack and pinion. It is, however, obvious that other well-known equivalent modes of feeding may be used, and that the relation between the speed of the saw and the rapidity of the feed may likewise be varied as circumstances may require.

When we desire to cut more than one line in the coal at a single forward movement of the saw, we attach two or more saws to the mandrel at suitable distances apart, so that when the coal is cut in double lines the blocks between the cuts can easily be detached; the mining is thus perfectly effected with the least possible waste.

It is obvious that to change the direction of the cut of the saw to a vertical one or to any angle desired, it is only necessary to change the position of the gearing and mandrel, which may be done in any of the known modes of changing the plane of rotation of the saw without departing from the principles of our invention, and, when desired, the machinery can be so arranged as to make a cut in a circle of which the driving-shaft can be made the center.

What we claim as our invention, and desire to secure by Letters Patent, is—

The combination, in a coal-mining engine, of one or more circular saws on a single mandrel with an adjustable feeding-mechanism arranged on a moving truck, substantially in the manner described, and for the purpose set forth.

In testimony whereof we have hereunto subscribed our names.

JOHN. S. FISK.
JAMES WESTERMAN.

Witnesses:
WM. D. BALDWIN,
EDM. F. BROWN.